Nov. 5, 1929.　　　　　G. BALZ　　　　　1,734,552
MECHANICAL ROASTING FURNACE
Filed June 7, 1927　　　5 Sheets-Sheet 1

INVENTOR.
Georg Balz

Nov. 5, 1929.  G. BALZ  1,734,552
MECHANICAL ROASTING FURNACE
Filed June 7, 1927  5 Sheets-Sheet 2

INVENTOR.
Georg Balz

Nov. 5, 1929.  G. BALZ  1,734,552
MECHANICAL ROASTING FURNACE
Filed June 7, 1927   5 Sheets-Sheet 3

INVENTOR.
Georg Balz

Nov. 5, 1929.  G. BALZ  1,734,552
MECHANICAL ROASTING FURNACE
Filed June 7, 1927    5 Sheets-Sheet 4

INVENTOR.
Georg Balz

Nov. 5, 1929.  G. BALZ  1,734,552
MECHANICAL-ROASTING FURNACE
Filed June 7, 1927    5 Sheets-Sheet 5

INVENTOR.
Georg Balz

Patented Nov. 5, 1929

1,734,552

UNITED STATES PATENT OFFICE

GEORG BALZ, OF GLEIWITZ, GERMANY, ASSIGNOR TO BALZ-ERZRÖSTUNG GESELLSCHAFT MIT BESCHRÄNKTER HAFTUNG, OF GLEIWITZ, GERMANY

MECHANICAL ROASTING FURNACE

Application filed June 7, 1927, Serial No. 197,050, and in Germany February 22, 1927.

This invention relates to mechanical roasting furnaces having a plurality of roasting chambers or compartments, which are arranged in superimposed manner, and which communicate with each other by means of openings arranged alternately at the centre and the periphery.

Mechanical furnaces are old, which comprise a plurality of stories communicating with each other by means of openings arranged alternately at the centre and towards the sides. For the purpose of causing the material as to be smelted to traverse the furnace from the top towards the bottom, passing through the openings referred to, the material is set into motion by means of conveying members, which plough through the same and move it slowly along the hearth level until it drops through the openings to the level situated thereunder. It has hitherto been usual to arrange the conveying members either on arms, which in turn were mounted on a vertical shaft rotary in the axis of the furnace, or in plates rotating in the ceiling of the compartment, so that in the latter case the material situated on the bottom of the compartment is conveyed from story to story through the alternately situated communication openings by the relative movement between the rotary and the fixed hearth plates.

When using arms it is necessary for the single compartments to be relatively high, in order to allow for unobstructed movement of the said arms: this, however, does not assist towards the smelting, since the heat is not utilized in the most favorable manner, a relatively high layer of air being situated above a relatively shallow layer of material. It is accordingly desirable to make the individual compartments as low as possible. This has hitherto not been possible by reason of the necessity for providing the arms with considerable strength the same being held only at their one end and not supported at the free end, in addition to which the same are also loaded by the conveying members, and moreover greatly subjected to strain by the resistance encountered upon the conveying members ploughing through the material. It has been usual to guard the arms against combustion by making the same hollow and providing for the passage of cooling air therethrough.

In the case of the second construction, in which hearth plates are used which are arranged to be fixed and rotary in alternate order, and in which one movable and one immovable hearth plate assist to form a compartment, the movable plates are rotated from the exterior, the force causing the rotation being applied at the periphery of the rotary hearth plates. For this purpose the ring on each rotary plate causing movement is furnished with teeth, which are engaged from the outside by a smaller gear wheel, and all operating wheels are mounted on a common shaft situated on the outside, the rotary hearth plates each moving by means of guide wheels or runners on appertaining rails. These rails are mounted on fixed supports, the latter also carrying the immovable hearth plates. In this manner the speed of rotation may be the same in the case of all movable plates, or may be different, for example the speed may be decreased from the top towards the bottom, this being effected by making the teeth of the outer driving wheels in suitable ratio to the toothed rims of the rotary plates. The movable plates carry—let into the arch— conveying members, the latter accordingly being rotated conjointly with the plates. Accordingly large masses are required to participate in the rotary movement, and from a practical standpoint this is extremely uneconomical in view of the consequent consumption of power.

In connection with furnaces of the type referred to merely the lower muffle is heated, and the air passes through the furnace from the bottom towards the top, in opposition to the direction taken by the material.

Accordingly, it is known on the one hand to provide strong arms for the conveying members which are secured merely at the one end to the inner shaft and otherwise suspended freely, and on the other hand to furnish strongly constructed, rotary plates, the conveying member being fitted into the arch thereof and rotated conjointly with the same.

The drawbacks associated with these two kinds of mechanical furnaces having a plurality of horizontal compartments, which are situated in superimposed manner and communicate with each other by means of openings arranged alternately at the centre and the periphery, are entirely eliminated according to the invention.

The invention resides in supporting the arms, which are preferably in band like form, at both ends, and this is effected by connecting the free ends of the arms to revolving rings, the operation being performed either through the medium of a rotary shaft passed through the axis of the furnace, or from the exterior. In the latter case the rings are constructed on the outer periphery to form toothed rims which are engaged by operating gear wheels. The supporting of the arms at both ends may, however, be effected in direct manner if the drive is performed from the central shaft, i. e., the revolving rings may be omitted. It is also possible to employ an exterior drive in combination with an inner drive. All parts subjected to heat are preferably composed of a highly refractory material capable of offering resistance to gases and acids. The individual hearth plates are all stationary and accordingly firmly connected with the framework, and the compartments formed by the individual plates may be packed off well against the exterior. It is possible to make the single compartments substantially lower than was heretofore the case, and it is also possible in the case of the furnace according to the invention to employ with great advantage the idea of introducing the air in an opposite direction to the material.

In the case of a revolving ring operated by means of an axial shaft, the same is preferably furnished with arms or spokes passing to a hub placed over the shaft, so that in a manner of speaking the ring becomes a wheel. If the drive is performed from the exterior, the individual arms carrying the conveying members may, in addition to being secured to the revolving rings, also be suspended in rotary manner from the individual arches at the centre thereof, in order to prevent any sag; or a supporting means for the arms may be provided in the axis of the furnace; or in the same manner a ring or a plurality thereof might be used for strengthening the whole of the rotary arrangement.

For the purpose of being able to keep the force required for the drive as low as possible, and in order to ensure that the revolving rings maintain the original position accorded to them, the same are guided at certain points, and by suitable construction of the ring guides or arrangement of the antifriction means respectively the rings are also prevented from warping or being deformed, since upon the rotary movement the same are constantly being straightened and rectified, for the arms, to which the conveying members are secured in either fixed or detachable manner, as well as the rings preferably consist, as already mentioned, of a metal which is capable of offering resistance to heat, gases or acids, and the conveying members may also consist of a similar material. For the purpose of initially eliminating any tendency on the part of the arms to sag, it is merely necessary to furnish the same with a U-shaped, tubular or other cross-section which tends fundamentally to eliminate any possibility of sagging. For the purpose of causing any material falling on to the arms to again drop off the same, the arms may be roof-shaped or curved towards the top. The conveying members may be integral with the arms, the connection being established, for example, by pressing. The conveying members may also be secured separately, and may be furnished with any particular form which is considered necessary or desirable. The attachment of the arms to the revolving rings may be of a fixed or detachable kind, and may also be arranged in such manner that the same, particularly when using carrying bands, are capable of being subsequently tensioned, for example by the use of wedges or the like. The arms may, if necessary, be surrounded by an insulating material, or embedded in the same, or the arms may also be made hollow to allow the passage of a cooling agent, and in the event of air being used for that purpose the said air may be allowed to pass out either upwardly against the arch, or downwardly on to the material, or in different directions, as may be desirable or necessary. In the case of tubular arms air may be sucked in from the exterior to the axial shaft.

The rings, which, as stated, consist of a highly refractory metal capable of offering resistance to gases and acids, may also be furnished with any desired cross sectional form, and move on wheels, which in turn roll along rails situated on the lower hearth plate of each compartment. Each ring in turn may consist of two or more concentric rings connected to each other in any suitable manner. The rings are provided directly below the fixed arches and constitute together with the arms a very small mass which requires to be actuated.

If the arms are not secured at their free ends to revolving rings, but are connected to a revolving shaft, the free ends of the arms move, in accordance with the invention, either directly or indirectly over circular tracks, preferably with the use of anti-friction means. The arms may be constructed extending towards both sides, or may be in star formation; or the same may also be sloped so that the conveying members are situated inclinedly to the hearth level located thereunder. The track for the runners may be made integral with the one or other hearth plate, and the hearth plate may also be made of a highly refractory metal capable of offering resistance to gases and acids and produced by pressing or casting.

Since in the case of the present embodiment all hearth plates are stationary, the compartments may be packed off well against the exterior, and the apertures necessary for observing the state of operation in the furnace, and also the closure means for the same, may be better selected than heretofore.

The observation and stirring apertures may be so arranged that in a manner of speaking a double window is formed, and the inner window still remains closed when the outer window is opened. This arrangement may naturally also be effected in any other desired manner.

The furnace may be provided on the outside with a double jacket, the revolving rings extending beyond the inner jacket and reaching the outer driving wheels through the outer jacket. In this manner the furnace is also packed off well against the exterior. It is, however, also possible, particularly in the case of furnaces having an inner axial shaft, to provide a conical or funnel shaped inner ring, adjacent to which are the outer openings communicating between the compartments. The arms, in addition to the conveying members, may also be furnished with scrapers for the purpose of preventing accumulation of the blende, and this object may be attained by providing each arm with a peculiar construction or by mounting the same in a peculiar position, for example, as already mentioned, an inclined position, since in this case a band shaped arm will also prevent the blende accumulating to such degree on the hearth level as to extend to the arch.

In the accompanying drawings the invention is illustrated by way of example in one of the numerous forms of embodiment which may be employed.

Figure 1:
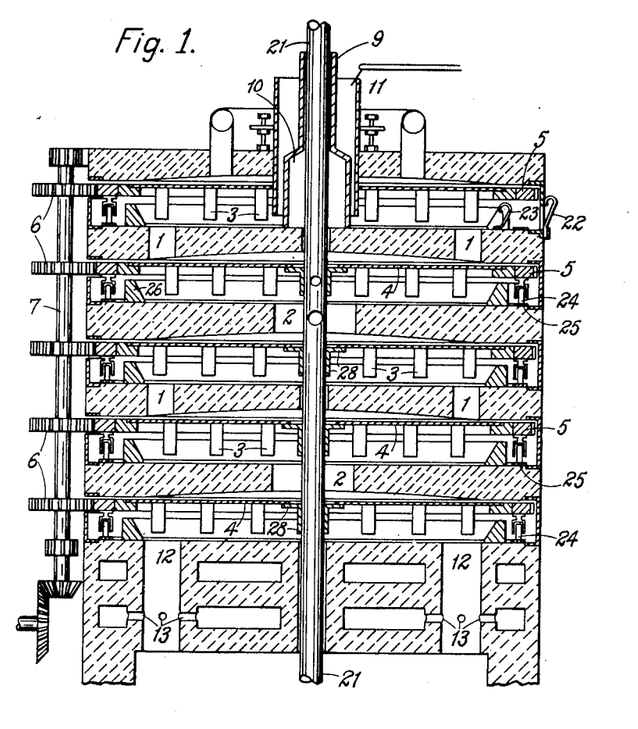
Fig. 1 shows a mechanical furnace in which the drive is effected from the exterior.

As shown in Fig. 1, the hearth plates are all fixed, so that in the known manner compartments or stories are formed between the same, and the material to be roasted is passed through the communication openings 1, and 2, which are situated alternately at the outer periphery and in the centre of the hearth plates, the material being moved by the conveying members 3.

The invention resides in the fact that the conveying members 3 are mounted on flat arms 4, which are supported at their free ends by revolving rings 5, each ring being furnished with teeth on the periphery engaged by small gear wheels 6 on the exterior, so that the conveying members move between the fixed hearth level and the fixed arch. The gear wheels 6 may be mounted on a common shaft 7, or a plurality of shafts 7 may be provided if it is desired to accord the ring 5 different possibilities of movement. The arms or bands 4 may be suspended in rotary fashion at the centre thereof in order to avoid any tendency to sag; or the same may be furnished with a special cross sectional form in order to provide greater resistance, or a special cross sectional form may be used in combination with the central suspension or supporting means; or support may also be effected in any other manner. All parts subjected to heat consist of a highly refractory metal capable of offering resistance against gases and acids.

In accordance with Fig. 1 the air is introduced at the top through a pipe 21, and the blende is fed about the pipe 21, the latter being surrounded by a pipe 9 which is widened out at 10.

As the material is fed to the furnace the same is accordingly picked up by the conveying members 3 in the uppermost compartment or story, and passed to the communication opening 1, where it falls through into the next compartment, and so on. The arrangement may be of such kind that the secondary air producing the necessary reaction in the particular compartment into which the same passes out, is introduced through the pipe 21, and this pipe may be connected to the arms 4 as a central supporting shaft for the latter.

According to Fig. 1 the discharge 12 for the blende is performed at the lowest hearth level, with heatable supply of air effected through openings 13 from pre-heated chambers, in order to cause the falling blende to be swept by hot air and to assist the desulphurization in the most favorable manner also at this point.

Figure 2:
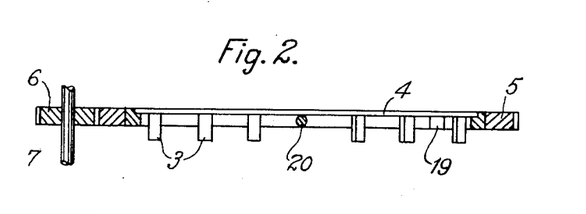
Fig. 2 shows a ring with supporting arm and conveying members on the latter.

Fig. 2 shows in section that the ring 5 may consist of two concentric rings which supplement each other, and the outer ring may consist of metal and the inner ring of a different refractory material, the outer ring then being protected by the inner ring.

Figure 3:
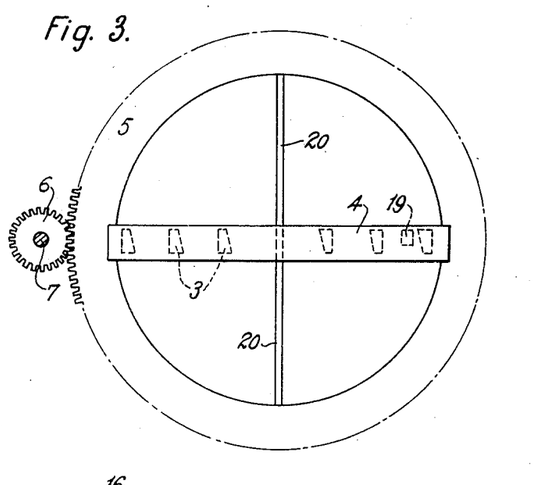
Fig. 3 is a plan view of Fig. 2.

Fig. 3 is a plan view of Fig. 2, and also shows the operation of the revolving ring 5 by the gear wheel 6.

Figure 4:
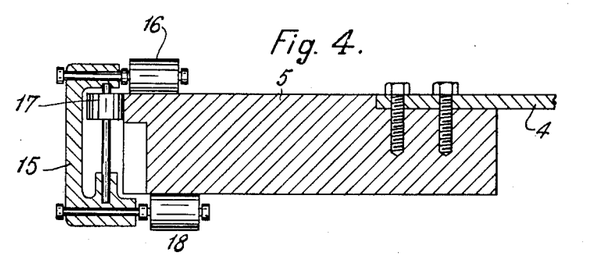
Fig. 4 shows a revolving ring portion on larger scale with an example of the guiding means employing rolls.

As shown by Fig. 4, the arm 4 may be secured to the ring 5 by means of screws or the like, this figure also showing the method of guiding the ring at a plurality of points, a common supporting member 15 being furnished to receive supporting means as well as guiding means for the ring 5. Such guide means may be arranged at various points on the periphery of the ring without in any way affecting the operation of the furnace, as clearly disclosed in the case of the uppermost ring on the left hand side of Fig. 5. These guide means are protected against heat, since the furnace is constructed with a double jacket, inner jackets being situated below the revolving rings, the latter extending beyond the jacket rings into the annular space formed between the inner and outer jackets, into which space on the other hand the small gear wheels 6 project in the case of exterior drive. In this annular space are also situated at desired points the guide means according to Fig. 4. These guide means may naturally also be constructed in other manner to that specifically shown in the figure in question.

As shown in Figs. 2 and 3 separate scrapers 19 may also be provided in addition to and behind the conveying members 3, having the object of levelling off or removing any accumulations of blende which may be formed. It is, however, also possible to directly utilize the arm 4 for the same purpose, either by reason of its straight or inclined adjustment.

For the purpose of relieving the arms 4, the ring 5, according to Figs. 2 and 3, is tensioned by a strut 20, the arm 4 preferably being mounted on the said strut, so that the same is also thus protected and ensured against any sag at its centre point. The most varied means may be employed in attaining this object, and it is obvious that in place of a simple strut a multiple construction in star form might be utilized, and that if necessary the arms 4 may also be arranged and employed in star form.

In Fig. 1 is also shown the arrangement of a double closing means 22, 23 by which the observation apertures may be uncovered, and such apertures, as well known also serve for the introduction of rabbles. Two openings are provided, one behind the other, the one being in the inner jacket and the other in the outer jacket of the furnace, and such openings may naturally be provided in any desired number about the periphery of the furnace.

Figure 5:
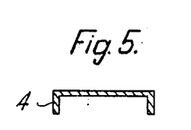
Figs. 5–10 show possible cross sectional forms of the arms and arrangement of the conveying members thereon.
Figure 6:
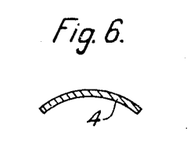
Figure 7:
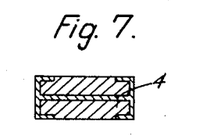
Figure 8:
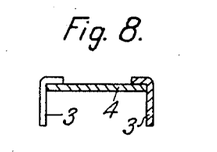
Figure 9:
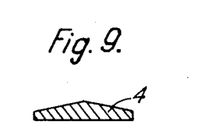
Figure 10:
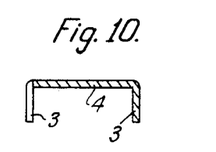

Fig. 5 shows an arm of U shaped cross section, the arm 4 thus being considerably strengthened; the arm may also possess a curved cross section as shown in Fig. 6, or may be of such form as shown in Fig. 7, according to which the same is fitted with an insulating material at the top and the bottom; or any other suitable cross section may be chosen, for example a tubular arm of round or other cross section. According to Fig. 8, the conveying members may be secured to the arm 4 from the outside in the form of metal strips, or the cross section may be roof shaped as shown in Fig. 9; or the conveying members 3 may be integral with the arm 4, as shown in Fig. 10, or any other form may be employed. A band shaped arm, of this type possesses very little height.

Figure 11:
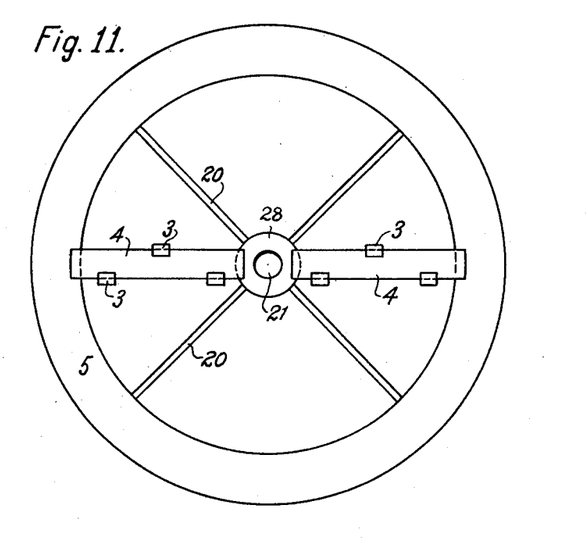
Fig. 11 shows in plan a revolving ring with arrangement of the arms in accordance with Fig. 5.

Fig. 11 shows in plan a ring 5 with arm, 4, with section through the hollow shaft 21, and the struts or spokes 20 lead to a hub ring, and these struts 20 may naturally possess any desired form or be in any arrangement. The same are not necessarily straight, i. e., disposed radially, but may be suitably curved or the like, as desired or considered necessary.

Figure 12:
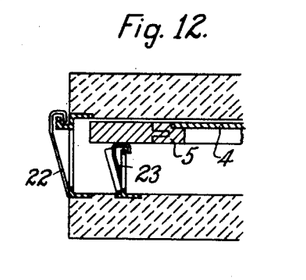
Fig. 12 shows in section an example of the arrangement for the observation apertures.

Fig. 12 shows on larger scale the double aperture with the closure means 22, 23, also the construction of the ring 5 as double ring, two concentric rings being connected together and the inner ring protecting the outer ring against radiation of heat. The connection of the two rings may be effected in any desired manner, and will depend principally on the fact whether the two rings consist of the same or different materials.

Figure 13:
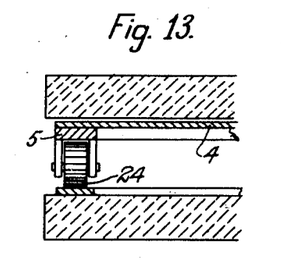
Figs. 13 and 14 show means for mounting the revolving discs.

Fig. 13 shows a form of embodiment in which runners or rolls 24 are fitted to the ring 5, the said runners moving over a circular track on the hearth level situated thereunder. These runners or rolls 24 may be provided on the ring in any desired manner.

Figure 14:
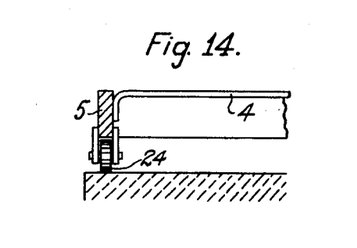

Fig. 14 shows the same arrangement in the case of a ring constructed edgewise, and naturally it is also possible to provide a plurality of such rings in concentric arrangement, in which latter case the arms 4, if the same are connected with each other at individual points, need merely to be suspended from the top.

Figure 15:
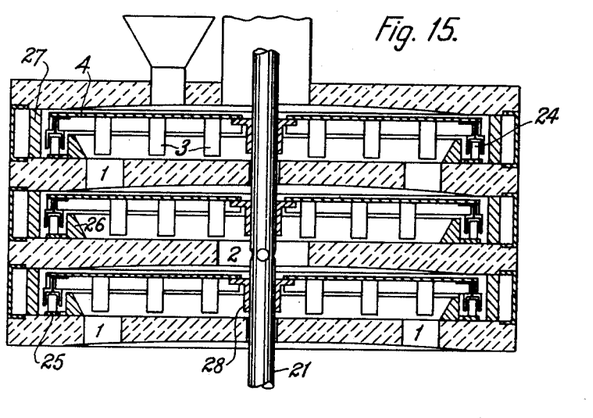
Fig. 15 shows a possible form of embodiment of a furnace in part view and in section, Fig. 16 a cross section, Fig. 17 the arrangement of a conveying member in the arm, Fig. 18 the arrangement of a roll or runner, Fig. 19 the construction of a hub member.
Figure 16:
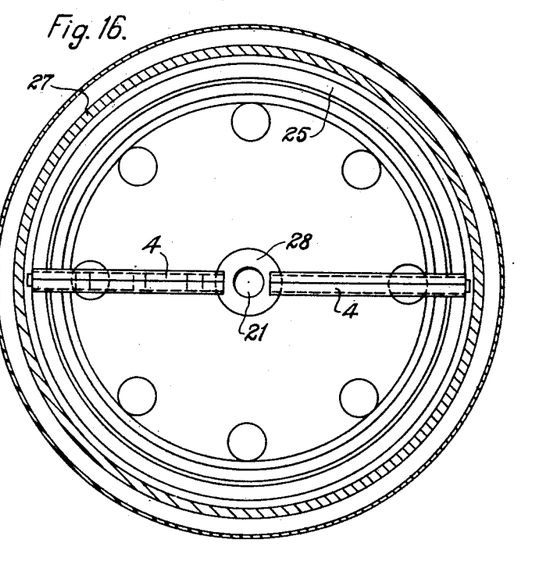

According to Figs. 15 and 16 the individual hearth plates, as in the case of the previous embodiments, are also furnished with communication apertures 1 and 2 and in the same manner the conveying members are mounted on arms 4. The latter, however, are not held together by revolving rings, but are supported at their free ends, the same moving with runners or rolls 24 over circular tracks 25. The furnace may be packed or closed off by means of rings 26 and 27, and the inner ring 26 may be set conically adjacent the outer communication opening 1, a funnel shaped embankment thus being formed.

Figure 17:
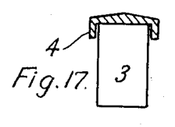
Figure 18:
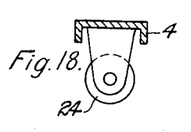
Figure 19:
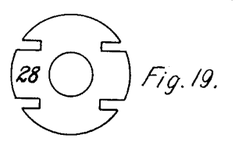

Fig. 17 shows one method of mounting the conveying members 3 on the arm 4. Fig. 18 shows the arrangement of a roll or runner 24 on the free end of an arm 4, whilst Fig. 19 is the top view of a hub member 28, which is suitably slotted to allow an arm 4 to be readily inserted therein by its two side members.

Figure 20:
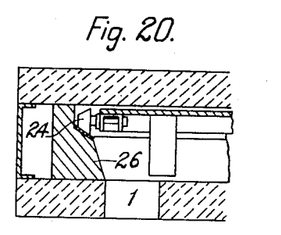
Figs. 20–22 show different arrangements of the runners.
Figure 21:
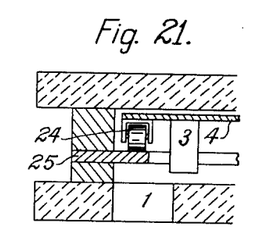
Figure 22:
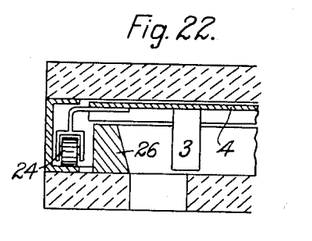

Fig. 20 shows the arrangement of a runner or roll 21 on the inner ring 26, Fig. 21 being a modification in which the cylindrical roll moves over a set-in circular track 22. Fig. 22 shows a still further modification in the arrangement of the roll.

Figure 23:
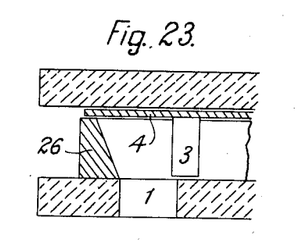
Fig. 23 the arrangement without anti-friction means.
Figure 24:
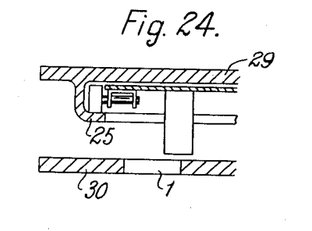
Fig. 24 the construction of the hearth plate with runner bar.

Fig. 23 shows how the arm 4 may be made to move with its free end over or along the inner ring 26 without the provision of anti-friction means, whilst in Fig. 24 the circular track 25 is integral with the hearth plate. The hearth plates 29, 30 may be pressed or cast from a highly refractory metal offering great resistance against gases and acids.

Figure 25:
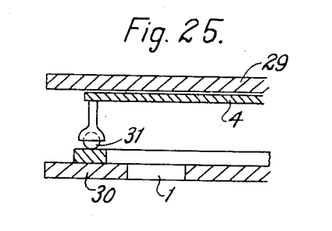
Fig. 25 the use of balls as anti-friction means.

Fig. 25 shows an additional embodiment of the anti-friction means in which a ball 31 is mounted at the free end of the arm 4.

By the arrangement of the arms 4 directly below each fixed hearth plate in conjunction with the revolving rings 5, or without the same, and the use of a double furnace jacket, the temperature may be regulated in very favorable manner, and the production accordingly increased, whilst moreover—and this applies particularly to furnaces having rotary hearth plates—the furnace may be constructed in more compact form. At the same time the operation of the conveying members is effected with the least possible consumption of power. This simplified operation at the same time also ensures a more even and reliable conveyance of the blende through the furnace, since the hearth levels may all be flat and are not required to ascend and decend as heretofore. The heavy wear and the irregular roasting in connection with furnaces of the hitherto known type are now eliminated, and it is possible to construct the furnace on very large dimensions, since the great masses to be actuated heretofore necessitated certain limitation in dimensions. The supply of air along the axis of the furnace may be effected from the top or the bottom, the latter being more preferable.

The outer windows may also be employed for supplying air from the exterior, since the double closure means 22, 23 are more effective as regards the roasting than the hitherto known arrangement. Since all hearth levels are fixed, and the conveying members are actuated in a manner peculiar thereto, the possibility exists of raising and lowering the hearth levels during operation by merely inserting or removing packing rings or the like. In addition to the advantages referred to many others will be encountered in practice which need not be referred to here.

What I claim as new and desire to secure by Letters Patent is:

1. A mechanical roasting furnace comprising a tier of circular, rigidly interconnected and rigidly supported, flat and spaced roasting floors, said floors having discharge apertures disposed alternately in the centre and at the periphery, radial, horizontally flat arms arranged in the spaces between said floors, means for supporting said arms close to the respective floor structures above them and so as to allow them to rotate about the center of the furnace, agitating and propelling vanes depending from said arms and extending close to the respective roasting floors, and means for imparting rotation to the arms about the centre of the furnace.

2. A structure as claimed in claim 1 wherein the supporting means for the arms comprises travelling rollers, and rings arranged on the floors as races for the rollers.

3. A mechanical roasting furnace comprising a tier of circular, rigidly interconnected and rigidly supported, flat and spaced roasting floors, said floors having discharge apertures disposed alternately in the centre and at the periphery, radial, horizontally flat arms arranged in the spaces between said floors, rings to which the outer ends of the arms are connected, supporting rollers adapted to carry said rings and arms close to the respective floor structures above them, rings placed on the floors as races for said rollers, annular walls rising from the floors inside the roller races so as to protect the rollers from the heat, agitating and propelling vanes depending from the arms and extending close to the respective roasting floors, and means for moving the arms and rollers about the centre of the furnace.

4. The structure claimed in claim 3 in combination with a centrally disposed vertical shaft to which the arms are connected.

5. The structure claimed in claim 3 in combination with a centrally disposed, hollow, vertical shaft to which the arms are connected, said shaft being provided with apertures for admitting additional air into the furnace.

6. A structure as claimed in claim 3 wherein the annular walls circumscribe the peripheral discharge apertures of the floors and slope towards said apertures.

In testimony whereof I have affixed my signature.

GEORG BALZ.